March 2, 1954  B. H. HADLEY  2,670,509
APPARATUS FOR LINING BEARINGS
Filed Aug. 24, 1950
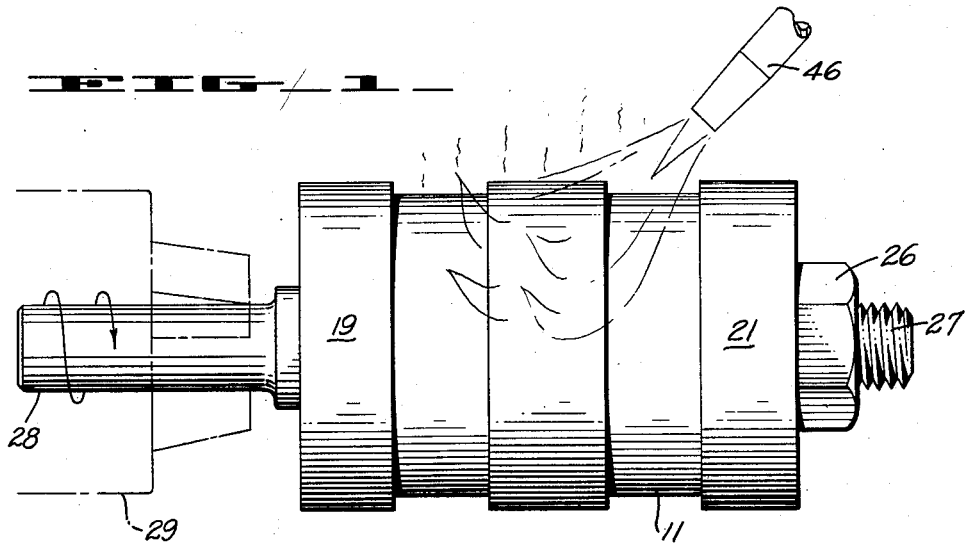
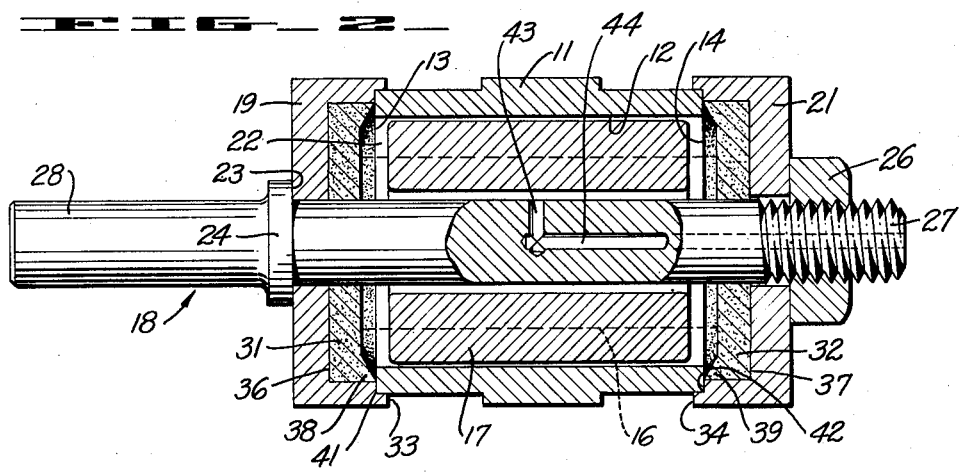
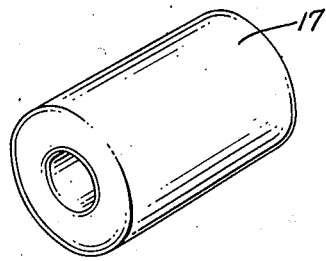
INVENTOR.
BENJAMIN H. HADLEY
BY
his Attorney Patented Mar. 2, 1954

2,670,509

UNITED STATES PATENT OFFICE 2,670,509

APPARATUS FOR LINING BEARINGS

Benjamin H. Hadley, Pomona, Calif.

Application August 24, 1950, Serial No. 181,297

5 Claims. (Cl. 22—58.5)

The invention relates to the manufacture of sleeve-type bearings, and more particularly to apparatus for lining bearing retainer members with a layer of Babbitt, lead alloy, or other antifriction bearing metal.

An object of the present invention is to provide an improved apparatus for applying and bonding a uniform layer of bearing metal to an internal cylindrical surface of a bearing retainer member wherein a preformed billet of bearing material is mounted in place in juxtaposition to the retainer surface and melted while in place and centrifugally deposited on such surface in an instantaneous reaction, thereby affording an extremely fast and precise moulding of the lining in place and an improved bonding and compacting of a clean, homogeneous layer of bearing material on the retainer surface, and the substantially complete elimination, from a practical standpoint, of the formation of slag or weakening oxides which customarily impair the bond between the bearing metal and the retainer surface and prevent the formation of a perfectly clean and homogeneous layer of bearing material.

Another object of the invention is to provide a self-aligning and self-balancing apparatus of the character described which is constructed of a minimum number of inexpensive, sturdily formed parts designed for quick and easy assembly and disassembly particularly adapted for production work requiring multiple re-use of the apparatus, and which is arranged to accommodate bearing retainer members of a variety of forms and shapes such as those having external protrusions, mounting flanges or the like.

A further object of the invention is to provide an apparatus of the character described which is adapted for use with existing conventional machinery and which does not require relatively intricate or costly installation.

The invention possesses other objects and features of advantage, some of which, with the foregoing, will be set forth in the following description of the preferred form of the invention which is illustrated in the drawing accompanying and forming part of the specification. It is understood, however, that variations in the showing made by said drawing and description may be adopted within the scope of the invention as set forth in the claims.

Referring to said drawing:

Figure 1 is a side elevational view of an apparatus constructed in accordance with the present invention and shown in operative association with other parts used in performing the process.

Figure 2 is a longitudinal sectional view of the apparatus illustrated in Figure 1.

Figure 3 is a perspective view of a bearing metal billet used with the apparatus of Figure 1.

The apparatus of the present invention pertains to the forming of a bearing lining or sleeve on the internal cylindrical surface of a bearing retainer member to provide an appropriate metal surface for journalling, supporting, and/or sealing of a relatively rotatable shaft part. Heretofore such linings have been formed by pouring of molten bearing metal into place by the use of a suitable mould or by spinning of the retainer member to provide a centrifugal deposit of the molten bearing metal on the surface to be lined. The relative disadvantages of former methods used include slowness of forming the bearing, required use of awkward and cumbersome devices, exposure of workmen to burns, spattering of hot metal, etc., and the formation in the molten metal of slag and oxides which impair the bond of the retainer member and become admixed in the body of the bearing layer. In accordance with the present invention and as a principal feature thereof, a preformed tubular billet of bearing material roughly corresponding to the shape of the lining to be placed is inserted within the hollow interior of the bearing retainer member, with the exterior surface of the billet in juxtaposition with the interior surface of the bearing retainer member, the interior of the bearing member closed off to define a substantially closed chamber, and the assembly spun at a relatively high speed around the axis of the surface to be bonded while being heated, whereby an instantaneous centrifugal deposit of the molten bearing material on the retainer surface is effected upon melting of the bearing material. In this manner, there is initially present a minimum amount of atmosphere between the exterior of the billet and the interior surface to be bonded, and the initial melting and displacement of the exterior periphery of the billet completely and effectively displaces this atmosphere, thereby practically eliminating the formation of slag or oxides which will interfere with the bonding of the bearing metal to the surface of the retainer member. Thereafter the further melting of the billet is effected in an environment which precludes the formation of such oxides, etc., thereby insuring the deposit of clean, homogeneous metal in the building up of the bearing lining. I have found that bearings produced by the process and apparatus of the present invention show marked increases in wear resistance, uniformity, toughness and durability under load conditions.

Considered of importance in obtaining these beneficial results is the practically instantaneous displacement of bearing metal when heated to its melting point onto the retainer surface and the high speed centrifugal movement of such molten material through an exceedingly short space and in the substantially complete absence of oxidizing atmosphere.

The apparatus of the present invention will be more fully understood with reference to the accompanying drawing wherein is illustrated a bearing retainer member 11 of the general type with which the process and apparatus is adapted to be used. This member may have any desired exterior shape and may be characterized for present purposes by its provision of an internal cylindrical bearing retaining surface 12 which extends for substantially the full length of the member between the opposite ends 13 and 14 thereof. This retainer member is customarily formed of iron or steel and a lining 16 generally denoted by a dash line on the drawing of bearing material is bonded to the surface 12 so as to provide an appropriate metal surface for journalling, supporting and/or sealing of a relatively rotatable shaft part not shown. Usually the bearing lining is periodically renewed during the life of the member 11.

In accordance with the present invention the bearing metal to be deposited on and bonded to the surface 12 is preformed or cast into a tubular billet 17 of cylindrical form having an external diameter slightly less than the internal diameter of the surface 12, a length roughly corresponding to the length of the surface 12, and a wall thickness corresponding to the desired thickness of the bearing layer to be bonded. The material may be of any of a variety of anti-friction metal linings used for present purposes such as Babbitt, and other alloys containing lead, tin, copper, zinc, antimony, etc. For example, a commonly used material for which the present process is well adapted is one containing 95% lead and 5% tin.

In practising the process, surface 12 is first carefully cleaned, as by washing in a suitable solvent or detergent to render it chemically clean, and is thereafter tinned. Such tinning may be accomplished by heating the part to approximately 550° F. with an appropriate flux and tin thereafter applied. After tinning, the billet 17 is inserted within the interior of the member 11, the ends of the member enclosed, and the assembly spun at a relatively high speed, approximately 1,500 to 2,500 R. P. M., and heat applied to cause the melting and centrifugal deposit of the bearing metal onto the surface 12 as hereinabove described.

In its preferred form the apparatus consists of a shaft 18 upon which is carried opposed abutment means here in the form of a pair of retaining members 19 and 21 adapted to engage the ends 13 and 14 of the bearing member 11. As may be seen from Figure 2 of the drawing, the retaining members and the inner surface 12 of the bearing member cooperate to define a chamber 22 for receiving the tubular billet 17. Means is provided for urging the retaining members against the ends of the bearing member and for securing the assembly to the shaft for rotation therewith, and as here shown includes a peripheral shoulder 23 formed on the shaft medially the length thereof and a means for clamping the retaining members and associated bearing member 11 against the shoulder 23. The shoulder may be conveniently provided in a peripheral integral collar 24 formed on the shaft 18. The aforementioned clamping means, preferably, and as here shown, consists of a nut 26 threaded onto one end 27 of the shaft 18 extending from the shoulder 23 for engagement with and urging the retaining member 21 towards the shoulder 23. The opposite end 28 of the shaft here extends from the collar 24 for convenient chucking into a rotating drive means 29 generally depicted in phantom lines in Figure 1.

As an important feature of the present invention, means is provided for preventing adherence of the molten bearing metal to the retaining members 19 and 21 which, for purposes of strength and durability and ability to withstand and transmit heat, are preferably formed of iron, steel or equivalent material to which some adherence of molten bearing metal is likely to occur.

As here shown, this means consists of non-metallic plates 31 and 32 carried by the confronting faces 33 and 34 of the retaining members 19 and 21 in endwise engagement with the opposite ends 13 and 14 of the bearing member 11 so that the end closures for the member 11 will be in the form of the plates 31 and 32. For convenience in manufacture the faces 33 and 34 may be recessed so as to receive the plates 31 and 32 as inserts. I have found that the fashioning of the plates 31 and 32 in the form of precast carbon disks afford an excellent and especially suited construction for present purposes. Preferably the exposed faces 36 and 37 of the inserts are recessed to provide annular pointed shoulders 38 and 39 at the outer peripheries of the disk for a ring-like engagement with the end faces 13 and 14 of the bearing member 11. These shoulders should substantially contact the opposite ends of the bearing member for purposes of sealing while leaving mechanical support of the bearing member to the body portion of the retainer members 19 and 21. As here shown, the latter are formed with confronting recesses or sockets 41 and 42 for receiving and supporting the opposite ends of the bearing member 11 in coaxial relation to the shaft 18. With repeated use of the device, the knife edge shoulders 38 and 39 may wear away slightly, exposing a very narrow ring on the retainer members 19 and 21 to the molten bearing metal. In such case a thin fin of bearing metal may adhere to the retainer members, but such fin may be readily broken off on disassembly of the device.

During the heating of the assembly there will be a general expansion of the atmosphere within the enclosure as well as the generation of gas from any flux left from the tinning operation. Accordingly appropriate venting means is provided for the enclosure and, as here shown, consists of a radial bore 43 in the shaft 18 which connects the chamber with an axial bore 44 in the shaft extending to the outer end 27 thereof.

In the operation of the apparatus above described the bearing retainer member 11 is first cleaned and thoroughly tinned at its inner surface 12. The part is then mounted over the shaft 18 against the abutment member 19, it being noted that the diameter of the shaft is substantially less than the internal diameter of the surface 12 so as to permit the mounting over the shaft and inside the surface 12, of the precast tubular billet 17 as above described. After insertion of the billet, the retainer member 21 is slid into place over the shaft end 27 and the nut 26 applied to rigidly clamp the bearing member 11 between the abutment members 19 and 21. The shaft end 28 may then be inserted into and grasped by a chuck 29 of any suitable machine for rotating the assembly at a relatively high speed. For the type of materials and construction more specifically here disclosed a rotating speed of between 1,500 and 2,500 R. P. M. is satisfactory, with about 1,800 R. P. M. preferred. Preferably the rotation of the assembly is in a horizontal position of the shaft. When the assembly is brought up to desired speed of rotation heat is applied to cause a melting of the billet 17. Preferably the assembly is heated from the exterior such as by playing the flame of a gas torch or burner 46 onto the exterior of the bearing member 11. Heat is then transmitted through the bearing member to the exterior of the billet and subsequently through the billet. As the exterior surface of the billet starts to melt there is an instantaneous centrifugal displacement of molten material onto the surface 12, it being noted that such molten material needs travel but a very short distance. Atmosphere and flux gas generated in the space between the billet and the surface 12 are rapidly displaced endwise of the surface and exit through the passages 43 and 44. As the billet continues to melt inwardly there is a further outward transfer of molten metal until all of the billet has been melted and centrifugally deposited, compacted and uniformly distributed upon the surface 12. After the bearing metal has been so melted and deposited the flame or other supplied heat is discontinued, permitting the assembly to cool, while rotation is continued until after the bearing layer has solidified.

Thereafter the nut 26 may be backed off the shaft end 27 and the retainer member and completed bearing part removed in the reverse order of their assembly. It will be especially noted here that the function of the carbon inserts 31 and 32 in preventing or minimizing the adherence of molten bearing metal to the end retainer members 19 and 21 permits a quick and easy disassembly. The bearing part may be finished as desired such as by reaming to desired diameter to fit the shaft part with which it will be used and by trimming all portions of bearing metal which will normally lap the opposite ends 13 and 14 by reason of the undercutting of the carbon inserts as illustrated. The several parts of the device may be immediately reassembled with another bearing member, thus repeatedly reused on a regular production basis.

It will now be apparent that the apparatus of the present invention will afford a rapid, economic production of bearings of the type described which will be uniformly of high quality in providing a dense, fully compacted, clean, homogeneous bearing lining which is firmly bonded to the retainer member and is substantially completely free from slag and oxide particles, and in which the completed bearings are of precise and predetermined form, thereby minimizing required machining preparatory to use.

I claim:

1. In a device for manufacturing bearings by applying and bonding a layer of bearing metal to the internal cylindrical surface of a bearing member having opposite ends defining the longitudinal edges of said surface, a pair of retaining members symmetrical to an axis of rotation and having coaxially opposed faces adapted to contact said bearing member ends to support said bearing member therebetween, the area of contact between said faces and member ends being provided by raised portions on said faces of annular form concentric to said axis and specially dimensioned for the bearing member to be supported so that the internal diameter of said portions is smaller than the outside diameter of said ends and larger than the inside diameter of said ends so as to support said ends while leaving uncontacted annular areas on said ends adjacent said cylindrical surface, means mounted on and covering said faces interiorly of said raised portions for preventing adherence of molten metal to said retaining members and extending away from said faces to the planes of said raised portions at the inside surfaces of said raised portions for engagement with said annular areas of said ends, and means for assembling said retainer members and bearing member as aforesaid for rotation about said axis.

2. In a device for manufacturing bearings by applying and bonding a layer of bearing metal to the internal cylindrical surface of a bearing member having opposite ends defining the longitudinal edges of said surface, a pair of retaining members symmetrical to an axis of rotation and having coaxially opposed faces adapted to contact said bearing member ends to support said bearing member therebetween, the area of contact between said faces and member ends being provided by raised portions on said faces of annular form concentric to said axis and specially dimensioned for the bearing member to be supported so that the internal diameter of said portions is smaller than the outside diameter of said ends and larger than the inside diameter of said ends so as to support said ends while leaving uncontacted annular areas on said ends adjacent said cylindrical surface, means mounted on and covering said faces interiorly of said raised portions for preventing adherence of molten metal to said retaining members and having concentric annular portions extending away from said faces to the planes of said raised portions at said inside surfaces of said raised portions for engagement with said annular area on said ends, the inside diameter of said annular portions of said means being greater than the inside diameter of said ends so as to permit the applying of bearing metal in a continuous layer across said surface and edges and onto said ends, and means for assembling said retainer members and bearing member as aforesaid for rotation about said axis.

3. In a device for manufacturing bearings by applying and bonding a layer of bearing metal to the internal cylindrical surface of a bearing member having opposite ends defining the longitudinal edges of said surface, a pair of retaining members symmetrical to an axis of rotation and having coaxially opposed cup-shaped faces defining concentric annular portions adapted to contact said bearing member ends to support said bearing member therebetween, said annular portions being specially dimensioned for the bearing member to be supported so that the internal diameter of said portions is smaller than the outside diameter of said ends and larger than the inside diameter of said ends so as to support said ends while leaving uncontacted annular areas on said ends adjacent said cylindrical surface, cup-shaped carbon inserts carried by said faces interiorly of said annular portions thereon for preventing adherence of molten metal to said retaining members and having outwardly flaring side walls extending away from said faces to the planes of said annular portions of said retaining members for engagement with said annular areas on said ends, the inside diameter of said insert side walls being greater at said planes than said inside diameter of said ends so as to leave exposed an area on said ends contiguous with said surface for receipt of bearing metal, and means for assembling said retainer members and bearing member as aforesaid for rotation about said axis.

4. In a device for manufacturing bearings by applying and bonding a layer of bearing metal to the internal cylindrical surface of a bearing member having opposite ends defining the longitudinal edges of said surface, a rotatable drive shaft, a pair of retaining members centrally apertured for mounting on said shaft and having coaxially opposed faces adapted to contact said bearing member ends to support said bearing member therebetween, the area of contact between said faces and member ends being provided by raised portions on said faces of annular form concentric to said shaft and specially dimensioned for the bearing member to be supported so that the internal diameter of said portions is smaller than the outside diameter of said ends and larger than the inside diameter of said ends so as to support said ends while leaving uncontacted annular portions of said ends adjacent said cylindrical surface, means mounted on and covering said faces interiorly of said raised portions for preventing adherence of molten metal to said retaining members and extending away from said faces to the planes of said raised portions at the inside surfaces of said raised portions for engagement with said annular portions of said ends, and means for clamping said retainer members to said bearing member and to said shaft for rotation therewith.

5. In a device for manufacturing bearings by applying and bonding a layer of bearing material to the internal cylindrical surface of a bearing member having opposite ends defining the longitudinal edges of said surface, a drive shaft formed for attachment to rotary drive means and having a diameter less than the diameter of said surface to permit insertion of said shaft axially through said bearing member and the positioning between said shaft and said surface of a tubular billet of bearing metal, a pair of retaining members mounted on said shaft for rotation therewith and having coaxially opposed concentric annular portions specially dimensioned for the bearing member to be supported so that the internal diameter of said portions is smaller than the outside diameter of said ends and larger than the inside diameter of said ends so as to contact and support said ends while leaving uncontacted annular areas on said ends adjacent said cylindrical surface, said retaining members defining with said shaft and bearing member an enclosed chamber for said billet, cup-shaped carbon inserts carried by said retaining members interiorly of said annular portions thereon preventing adherence of molten metal to said retaining members and having side walls extending to the planes of said annular portions of said retaining members for engagement with said annular areas on said ends and being proportioned to leave exposed a part of said area contiguous with said surface for receipt of bearing metal, means for clamping said retainer members to said bearing member and said shaft for rotation therewith, and means providing an exit passage for said chamber at said shaft.

BENJAMIN H. HADLEY.

References Cited in the file of this patent

UNITED STATES PATENTS

| Number | Name | Date |
|---|---|---|
| 422,590 | Haskins | Mar. 4, 1890 |
| 914,459 | Schwaninger | Mar. 9, 1909 |
| 1,433,763 | Warn et al. | Oct. 31, 1922 |
| 1,923,075 | Brown | Aug. 22, 1933 |
| 1,944,461 | Pike | Jan. 23, 1934 |
| 2,222,525 | Zink | Nov. 19, 1940 |
| 2,361,906 | Anderson | Nov. 7, 1944 |
| 2,381,616 | Pfleger | Aug. 7, 1945 |

FOREIGN PATENTS

| Number | Country | Date |
|---|---|---|
| 401,533 | Great Britain | Nov. 16, 1933 |